No. 841,071. PATENTED JAN. 8, 1907.
W. TIERNAN.
CULTIVATOR ATTACHMENT.
APPLICATION FILED SEPT. 1, 1906.

Witnesses:
R. H. Orwig.
L. L. Leibrock.

Inventor: William Tiernan,
By Thomas G. Orwig, Attorney.

UNITED STATES PATENT OFFICE.

WILLIAM TIERNAN, OF ROLFE, IOWA.

CULTIVATOR ATTACHMENT.

No. 841,071.     Specification of Letters Patent.     Patented Jan. 8, 1907.

Application filed September 1, 1906. Serial No. 333,230.

*To all whom it may concern:*

Be it known that I, WILLIAM TIERNAN, a citizen of the United States, residing at Rolfe, in the county of Pocahontas and State of Iowa, have invented a new and useful Cultivator Attachment, of which the following is a specification.

My object is, first, to provide a simple, strong, durable, and inexpensive attachment for cultivators that can loosen and direct soil to a row of small plants, especially corn, and by means of the attachment prevent lumps of ground from falling on and crushing them and allowing only fine soil to get near to and around the plant; second, to provide means for adjusting the device as required to be advantageously used at different times for plants of different height; third, to provide means for uncovering leaves of plants when loose ground has fallen on them and bound them down.

My invention consists in the construction, arrangement, and combination of elements and subcombinations, as hereinafter set forth, pointed out in my claims, and illustrated in the accompanying drawings, in which—

Figure 1:
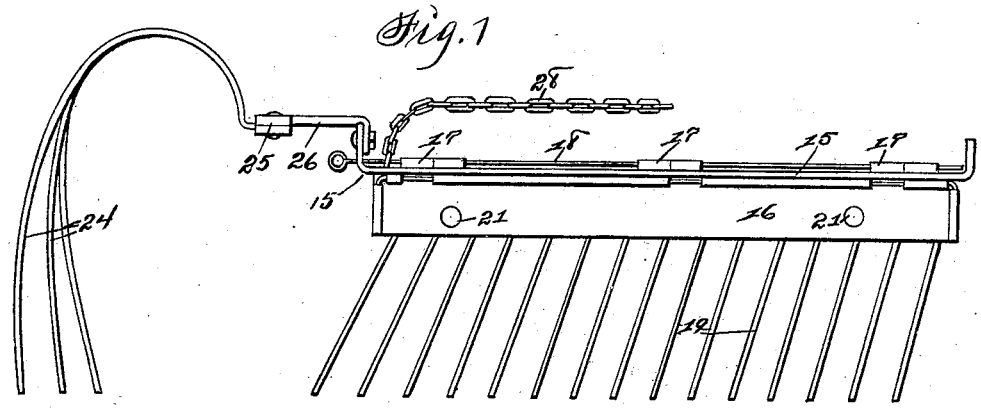
Figure 2:
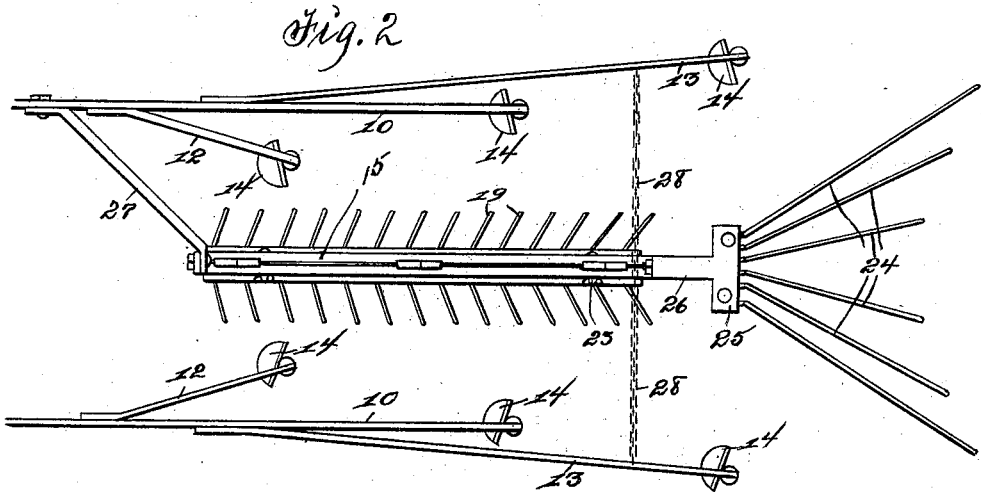
Figure 3:
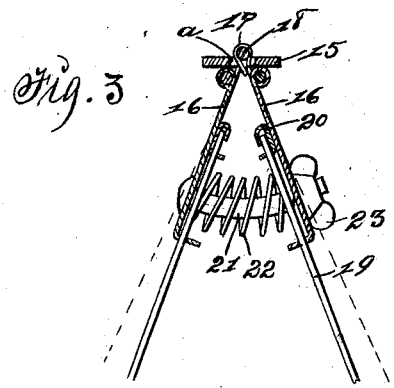

Figure 1 is a side view of the device and shows the positions of the different parts relative to each other. Fig. 2 is a top view of two cultivator beams and shovels carried thereby and my attachment detachably connected therewith as required in practical use. Fig. 3 is a vertical sectional view of the main part of my invention, and dotted lines indicate how the two rows of teeth may spread apart relative to a row of plants that they may stride when in operation.

The numeral 10 designate straight beams, and 12 and 13 are branches fixed thereto to incline in opposite directions as required to carry shovels 14 in separate parallel lines when in operation.

The main part of my invention that is designed to be advanced astride a row of plants consists of a straight metal bar 15, bent upward at its ends, as shown in Fig. 1, and provided with longitudinal slots *a* at its ends and center, as shown in Fig. 3.

Two flat plates 16 are provided with hinge members 17, that project up through the slots in the bar 15, and a wire or rod 18 is extended through the hinge members as required to pivotally connect the flat plates 16 with the bar 15, so the plates can be adjusted relative to each other, as shown in Fig. 3. To the inside faces of the flat plates 16 are fixed rows of teeth 19 by means of metal strips 20, as shown in Fig. 3, or in any suitable way in such a manner that the teeth will extend through holes in the inwardly-turned lower edge portions of the plates to be supported by the plates and moved in and out with the plates relative to a row of plants. To hold the plates 16 and teeth 19 spread apart and to regulate their degrees of angle relative to their pivotal connection - rod 18, curved screw-bolts 21 are fixed in their end portions and wire springs 22 placed on the bolts and thumb-nuts 23 on the ends of the bolts, as shown in Fig. 3, or in any suitable way. The springs 22 will normally press and retain the plates 16 apart, and by means of the thumb-nuts 23 the springs can be readily contracted or allowed to expand as required to adjust the plates 18 relative to each other.

To stir the loose ground that may have fallen on some leaves of plants as a cultivator is advanced and to push lumps outward relative to the plants, a plurality of spring-teeth 24 are fixed to a cross-head 25 on the ends of a bar 26, that is detachably fixed to the rear end of the bar 15 by means of a bolt and nut, as shown in Fig. 1, or in any suitable way in such a manner that the teeth will traverse the loose ground and spread and level it and move clods outward and away from the plants.

To connect the attachment to two cultivators as required to retain it midway between them, a bar 27 is fixed to the front end of the bar 15 and to one of the cultivator-beams 10 and a chain 28, connected at its center with the rear end of the bar 15 and the branch beams 13, as shown in Fig. 3, or in any suitable way.

Having thus set forth the purposes of invention and the manner of its construction, application, and use, the practical operation and utility thereof will be obvious.

What I claim as new, and desire to secure by Letters Patent, is—

1. In an attachment for cultivators, a straight bar having longitudinal slots and two flat plates having hinge members at their tops extended up through said slots and a rod extended through the hinge members to operate as set forth.

2. In an attachment for cultivators, a straight bar and two flat plates pivotally connected with said bar to project downward and outward relative to the bar.

3. In an attachment for cultivators, a straight bar having longitudinal slots and two flat plates having hinge members at their tops extended up through said slots and a rod extended through the hinge members and a plurality of teeth fixed to each plate to extend down below the lower edge thereof, to operate as set forth.

4. In an attachment for cultivators, a straight bar and two flat plates pivotally and adjustably connected with said bar to project downward relative to the bar and a plurality of teeth fixed to each plate to extend down below the plate.

5. In an attachment for cultivators, a straight bar having longitudinal slots and two flat plates having hinge members at their tops extended up through said slots and a rod extended through the hinge members and a plurality of teeth fixed to each plate to extend down below the lower edge thereof, screw-bolts extended through holes in the plates, coil-springs on the bolts and thumb-nuts on the ends of the bolts to operate as set forth.

6. In an attachment for cultivators, a straight bar and two flat plates pivotally connected with said bar to project downward relative to the bar and a plurality of teeth fixed to each plate to extend down below the plate and means for spreading apart and holding the plates apart at different distances at different times as set forth.

7. In an attachment for cultivators, a straight bar having teeth pivotally connected therewith to project outward and downward in reverse ways and a second bar having a cross-head at its rear end and spring-teeth fixed to the cross-head to project rearward and downward fixed to the rear end of the straight bar, to operate as set forth.

8. An attachment for cultivators comprising a straight bar, two flat plates pivotally connected with the straight bar, a plurality of teeth fixed to each plate and means for adjusting the flat plates arranged and combined to operate as set forth.

9. An attachment for cultivators comprising a straight bar, two flat plates pivotally connected with the straight bar, a plurality of teeth fixed to each plate and means for adjusting the flat plates, a bar having a cross-head and spring-teeth fixed to the cross-head, arranged and combined to operate as set forth.

10. An attachment for cultivators comprising a straight bar, two flat plates pivotally connected with the straight bar, a plurality of teeth fixed to each plate and means for adjusting the flat plates, a bar having a cross-head and spring-teeth fixed to the cross-head, and means for detachably connecting the attachment to cultivators, arranged and combined to operate as set forth.

WILLIAM TIERNAN.

Witnesses:
 WILL PORTER,
 D. E. MAYNE.